US012709700B2

(12) United States Patent
Tenko et al.

(10) Patent No.: US 12,709,700 B2
(45) Date of Patent: Aug. 18, 2026

(54) POLISHING COMPOSITION, METHOD FOR PRODUCING POLISHING COMPOSITION, AND POLISHING METHOD

(71) Applicant: FUJIMI INCORPORATED, Kiyosu (JP)

(72) Inventors: Kyosuke Tenko, Kiyosu (JP); Jun Ito, Kiyosu (JP); Daisuke Yasui, Kiyosu (JP); Hitoshi Morinaga, Kiyosu (JP)

(73) Assignee: FUJIMI INCORPORATED, Kiyosu (JP)

( * ) Notice: Subject to any disclaimer, the term of this patent is extended or adjusted under 35 U.S.C. 154(b) by 412 days.

(21) Appl. No.: 18/285,091

(22) PCT Filed: Mar. 29, 2022

(86) PCT No.: PCT/JP2022/015601
§ 371 (c)(1),
(2) Date: Sep. 29, 2023

(87) PCT Pub. No.: WO2022/210744
PCT Pub. Date: Oct. 6, 2022

(65) Prior Publication Data

US 2024/0182750 A1 Jun. 6, 2024

(30) Foreign Application Priority Data

Mar. 31, 2021 (JP) ................................ 2021-059448

(51) Int. Cl.
*C09G 1/02* (2006.01)
*C09K 3/14* (2006.01)

(52) U.S. Cl.
CPC .............. *C09G 1/02* (2013.01); *C09K 3/1409* (2013.01)

(58) Field of Classification Search
CPC ................................ B24B 27/033; C09G 1/02
USPC .................................................... 51/306, 307
See application file for complete search history.

(56) References Cited

U.S. PATENT DOCUMENTS 2,561,816 A * 7/1951 Holzinger ................ C09G 1/08 106/196.1
2,839,482 A * 6/1958 Geen ........................ C09G 1/12 106/6
5,094,687 A 3/1992 Elepano
5,334,335 A 8/1994 Norville
6,258,882 B1 * 7/2001 Wachowiak, Jr. ... C09D 133/10 106/11
2004/0067860 A1 * 4/2004 Lee ...................... C11D 7/3263 257/E21.255
2005/0277718 A1 * 12/2005 Johnson ................... C09G 1/16 524/487
2008/0127856 A1 * 6/2008 Hasinovic ................ C09G 1/12 106/10
2009/0020089 A1 1/2009 Ryder et al.

FOREIGN PATENT DOCUMENTS

CN 101802136 A 8/2010
GB 0 838 679 A 6/1960
JP H02-269791 A 11/1990
JP H08-503233 A 4/1996
JP 2000-282011 A 10/2000
JP 2004-025323 A 1/2004
JP 2004-359831 A 12/2004
JP 2006-056996 A 3/2006
JP 2012-251099 A 12/2012
TW 201938748 A 10/2019
WO WO-2004/020543 A1 3/2004
WO WO-2016075880 A1 * 5/2016 ........... H01L 21/304

OTHER PUBLICATIONS

"Higher alkane," Wikipedia, retrieved from https://en.wikipedia.org/wiki/Higher_alkane (9 pages), accessed May 13, 2025.
Tanzi et al., "Terpenes as Green Solvents for Extraction of Oil from Microalgae," Molecules, Jul. 2012, 17, 8196-8205 (10 pages).
TW Office Action issued in Taiwanese Application No. 111112414, dated Apr. 21, 2025 (16 pages).
EP Supplementary Search Report for EP Appl. Ser. No. 22780955 dated Sep. 3, 2024 (8 pages).
CN Office Action for Application No. 202280026127.3 mailing date Aug. 1, 2025, 18 pages with English translation.
JP Office Action for Application No. 2023-511398 mailing date Oct. 7, 2025, 10 pages with English translation.
International Search Report with English Translation and Written Opinion of International Patent Application No. PCT/JP2022/015601 dated May 10, 2022 (10 pages).

* cited by examiner

*Primary Examiner* — Joel D Crandall
(74) *Attorney, Agent, or Firm* — Foley & Lardner LLP

(57) ABSTRACT

Provided is a polishing composition with excellent machining capacity, and good cleaning property after polishing. A polishing composition containing abrasive grains, water, and a hydrophobic dispersing medium, wherein the hydrophobic dispersing medium contains at least one selected from the group consisting of normal paraffin hydrocarbons, isoparaffin hydrocarbons, naphthenic hydrocarbons, and terpene hydrocarbons, and has a flash point of 30° C. or more and 100° C. or less, or a vapor pressure at 20° C. of 0.004 kPa or more and 2 kPa or less.

18 Claims, No Drawings

POLISHING COMPOSITION, METHOD FOR PRODUCING POLISHING COMPOSITION, AND POLISHING METHOD

CROSS-REFERENCE TO RELATED APPLICATIONS

This application is a U.S. National Stage Application of PCT International Application No. PCT/JP2022/015601, filed Mar. 29, 2022, which claims priority to Japanese Patent Application No. 2021-059448, filed Mar. 31, 2021, the disclosures of which are incorporated by reference herein in their entireties.

TECHNICAL FIELD

The present invention relates to a polishing composition, a method for producing a polishing composition, and a polishing method.

BACKGROUND ART

Coated surfaces of car body, and the like, are polished for the purpose of removing scratches caused during use of a car, achieving an even coating material surface upon recoating to repair scratches, and the like. In this case, the requisites include scratches are absent on a coated surface after polishing, the base color can be seen clearly, and a coated surface has no whitish appearance due to micro-scratches on the surface caused during polishing, and the like. The known method for polishing a coated surface is to polish, using a buff (polishing wheel) and a polisher attached to rotate the buff, by rotating the buff by the polisher while a polishing composition is interposed between the coated surface and the buff. Examples of such a polishing composition include the polishing composition described in Patent Literature 1.

Representative buffs used for polishing coated surfaces such as car body, and the like, include a wool buff and a sponge buff (urethane buff). The step of eliminating scratches on a coated surface can generally be classified into rough polishing and finish polishing. The rough polishing aims to eliminate scratches on a coated surface, whereas the finish polishing aims to remove micro-scratches caused by the rough polishing and whitening phenomenon of the coated surface. A wool buff is used in the rough polishing, whereas a sponge buff is used in the finish polishing. The scratch may be eliminated only by the finish polishing, but the polishing can be completed in a short time by combining the rough polishing and the finish polishing.

The polishing of a coated surface is carried out by dripping an appropriate amount of polishing agent (polishing composition) onto a coated surface or a buff surface, and spreading out the polishing agent on the coated surface using the buff. The buff is pressed against the coated surface and moved while being rotated by a polisher, and it is ideal that the polishing of the coated surface is completed after the buff passes through so that the polishing agent does not remain on the coated surface.

CITATION LIST

Patent Literature

Patent Literature 1: Japanese Patent Laid-Open No. 2012-251099

SUMMARY OF INVENTION

Technical Problem

The polishing composition described in Patent Literature 1 features that the polished surface maintains a wet state after polishing, but such a polishing composition hardly dries, a liquid film formed at the interface between a buff and a coated surface grows unnecessarily thick depending on the amount of the polishing composition supplied thereby preventing abrasive grains from contacting the coated surface and deteriorating machining capacity, hence problematic. The machining capacity refers to a force that physically removes an object to be polished and, for example, it refers to the force of abrasive grains that causes micro-scratches on the surface of an object to be polished. Further, the polishing composition that maintains a wet state likely remains on a coated surface, making it difficult to wipe off after polishing. Additionally, the polishing composition persistently adheres to a coated surface during the finish polishing thereby failing to achieve sufficient glossiness, hence problematic. This phenomenon is likely to occur particularly with a soft coating film.

Under such circumstances, an object of the present invention is to provide a polishing composition with excellent machining capacity and good cleaning property after polishing.

Solution to Problem

The present inventors have conducted extensive studies to achieve the above object. As a result, the inventors have found that the above object can be achieved by a polishing composition comprising abrasive grains, water, and a hydrophobic dispersing medium, wherein the hydrophobic dispersing medium contains at least one selected from the group consisting of normal paraffin hydrocarbons, isoparaffin hydrocarbons, naphthenic hydrocarbons, and terpene hydrocarbons, and has a flash point of 30° C. or more and 100° C. or less, or alternatively a polishing composition comprising abrasive grains, water, and a hydrophobic dispersing medium, wherein the hydrophobic dispersing medium contains at least one selected from the group consisting of normal paraffin hydrocarbons, isoparaffin hydrocarbons, naphthenic hydrocarbons, and terpene hydrocarbons, and has a vapor pressure at 20° C. of 0.004 kPa or more and 2 kPa or less, leading to completion of the present invention.

Effect of the Invention

According to the present invention, a polishing composition with excellent machining capacity and good cleaning property after polishing is provided.

DESCRIPTION OF EMBODIMENTS

Hereinafter, embodiments of the present invention will be described, but the present invention is not limited only to the following embodiments. It should be noted that operations and measurements of physical properties, and the like, are carried out under the conditions of room temperature (20° C. or more and 25° C. or less)/relative humidity of 30% RH or more and 50% RH or less, unless otherwise stated.

<Polishing Composition>

A first embodiment of the present invention is a polishing composition comprising abrasive grains, water, and a hydrophobic dispersing medium, wherein the hydrophobic dispersing medium contains at least one selected from the group consisting of normal paraffin hydrocarbons, isoparaffin hydrocarbons, naphthenic hydrocarbons, and terpene hydrocarbons, and has a flash point of 30° C. or more and 100° C. or less. Further, a second embodiment of the present invention is a polishing composition comprising abrasive grains, water, and a hydrophobic dispersing medium, wherein the hydrophobic dispersing medium contains at least one selected from the group consisting of normal paraffin hydrocarbons, isoparaffin hydrocarbons, naphthenic hydrocarbons, and terpene hydrocarbons, and has a vapor pressure at 20° C. of 0.004 kPa or more and 2 kPa or less.

The polishing compositions of the present invention with such constituent features have excellent machining capacity and good cleaning property after polishing in the case of polishing an object to be polished as the rough polishing or the finish polishing. The "excellent machining capacity" means that, for example, the machining capacity evaluation for scratch removal (elimination state) after polishing shows the time required to remove (eliminate) scratches being short, and the machining capacity evaluation for grinding margin (polishing speed) shows a grinding margin being large (polishing speed being high). Additionally, the "good cleaning property after polishing" means that little polishing composition remains on a coated surface after polishing, that is, removal time (cleaning time) of a remnant is short. Further, according to the polishing compositions of the present invention, adhered matters to a coated surface after polishing can be prevented in the finish polishing, thereby preventing the failure to achieve sufficient glossiness by such adhered matters.

In the polishing composition of the present invention, the hydrophobic dispersing medium contained therein has a flash point of 30° C. or more and 100° C. or less, or a vapor pressure at 20° C. of 0.004 kPa or more and 2 kPa or less. The present inventors focused on the flash point and the vapor pressure of the hydrophobic dispersing medium constituting the polishing composition and found a novel polishing composition with excellent machining capacity during polishing and cleaning property after polishing when the flash point or the vapor pressure of the hydrophobic dispersing medium is in the specific range. The reason for achieving the above effects by the polishing composition of the present invention is not clear.

A third embodiment of the present invention is a polishing composition comprising abrasive grains, water, and a hydrophobic dispersing medium, wherein the hydrophobic dispersing medium contains at least one selected from the group consisting of normal paraffin hydrocarbons, isoparaffin hydrocarbons, naphthenic hydrocarbons, and terpene hydrocarbons, and has a vapor pressure at 20° C. of 0.004 kPa or more and 2 kPa or less, and a flash point of 30° C. or more and 100° C. or less.

That is, the present invention is a polishing composition comprising abrasive grains, water, and a hydrophobic dispersing medium, wherein the hydrophobic dispersing medium contains at least one selected from the group consisting of normal paraffin hydrocarbons, isoparaffin hydrocarbons, naphthenic hydrocarbons, and terpene hydrocarbons, and has a vapor pressure at 20° C. of 0.004 kPa or more and 2 kPa or less, and/or a flash point of 30° C. or more and 100° C. or less.

"A and/or B" herein has the same meaning as "at least either one of A and B" and means to encompass all of the embodiment of only A, and the embodiment of only B, and the embodiment of A and B. That is, the "hydrophobic dispersing medium has a vapor pressure at 20° C. of 0.004 kPa or more and 2 kPa or less, and/or a flash point of 30° C. or more and 100° C. or less" may be any of the hydrophobic dispersing medium having a vapor pressure at 20° C. of 0.004 kPa or more and 2 kPa or less; the hydrophobic dispersing medium having a flash point of 30° C. or more and 100° C. or less; and the hydrophobic dispersing medium having a vapor pressure at 20° C. of 0.004 kPa or more and 2 kPa or less and a flash point of 30° C. or more and 100° C. or less. Further, a preferable embodiment of the present invention to be described later is suitably applicable to any of the first embodiment to the third embodiment of the present invention.

Hereinafter, each of the components contained in the polishing composition of the present invention will be described.

[Abrasive Grains]

The polishing composition of the present embodiment contains abrasive grains. The abrasive grains act to mechanically polish an object to be polished.

Specific examples of the abrasive grain used in the present embodiment include metal oxides such as aluminum oxide (alumina), silicon oxide (silica), cerium oxide (ceria), zirconium oxide, titanium oxide (titania), tin oxide, manganese oxide, metal carbides such as silicon carbide, and titanium carbide, metal nitrides such as silicon nitride, and titanium nitride, metal borides such as titanium boride, and tungsten boride, silicate compounds such as zircon ($ZrSiO_4$), and diamond. These abrasive grains can be used singly or in a mixture of two or more thereof. Alternatively, a commercial product may be used or a synthetic product may be used as the abrasive grain.

Of these abrasive grains, from the viewpoint of easily obtaining those having various particle sizes and achieving an excellent polishing speed, at least one selected from the group consisting of metal oxides and metal carbides is preferable, and silicon carbide, silicon dioxide, and metal oxides are more preferable, at least one of aluminum oxide (alumina), cerium oxide, and zirconium oxide are further preferable, and aluminum oxide is particularly preferable. Additionally, a mixture of alumina and zircon can also be preferably used.

Further, of the aluminum oxides, those containing the α phase as a preferable crystal structure as the abrasive grain for polishing, or those containing a crystal phase in a state of transitioning to the α phase such as the θ phase, δ phase, and γ phase are suitable. It is preferable to contain the α phase or the θ phase, and it is more preferable to contain the α phase. Additionally, it is considered that the α phase has optimal ranges depending on the degree of conversion into the α phase. Generally, the crystal structure of the α phase is considered to be the most rigid; on the other hand, it is presumed that sufficient sintering at a high temperature to form the α phase changes the shape of particles into spherical, resulting in lowered polishing performance. α-conversion rate is useful as a referential value that indicates the degree of conversion into α phase in aluminum oxide. The lower limit of the α-conversion rate is preferably 50% or more. The lower limit of α-conversion rate is further preferably 60% or more, further preferably 70% or more, particularly preferably 80% or more, and further preferably 90% or more. The upper limit of the α-conversion rate is preferably 100% or less. The upper limit of the α-conversion rate is more preferably 98% or less. That is, the α-conversion rate of aluminum oxide is preferably 50% or more and 100% or less, and more preferably 60% or more and 98% or less. When a α-conversion rate is within the above preferable ranges, it is estimated that the polishing ability enhances, that is, the scratch elimination speed increases, and the polishing rate enhances. The α-conversion rate of aluminum oxide particles can be calculated from an integrated intensity ratio of the (113) plane diffraction line by X-ray diffraction measurement using an X-ray diffractometer (Ultima-IV, manufactured by Rigaku Corporation).

The lower limit of the volume average particle size (average secondary particle size) of the abrasive grains is preferably 0.05 μm or more, more preferably 0.1 μm or more, and further preferably 0.2 μm or more. When a volume average particle size (average secondary particle size) of the abrasive grains is 0.05 μm or more, the machining capacity enhances, and an object to be polished can be well polished in both of the rough polishing and the finish polishing. The upper limit of the volume average particle size (average secondary particle size) of the abrasive grains is preferably 15 μm or less, more preferably 10 μm or less, further preferably 5 μm or less, particularly preferably 4 μm or less, and most preferably 3 μm or less. As a volume average particle size (average secondary particle size) of the abrasive grains gets smaller, it becomes easier to obtain a low-defect surface with small roughness. Thus, when a volume average particle size (average secondary particle size) of the abrasive grains is 0.05 μm or more and 15 μm or less, a low-defect surface with small roughness can be obtained while enhancing the machining capacity. Abrasive grains, while even having large particle sizes before polishing, whose polishing particles become smaller during polishing at the interface between a buff and an object to be polished (abrasive grains whose secondary particles disintegrate during polishing and become primary particles) may also be used. According to the above, the volume average particle size (average secondary particle size) of the abrasive grains is preferably 0.05 μm or more and 15 μm or less, more preferably 0.1 μm or more and 10 μm or less, further preferably 0.2 μm or more and 5 μm or less, particularly preferably 0.2 μm or more and 4 μm or less, and most preferably 0.2 μm or more and 3 μm or less. In an embodiment, the volume average particle size (average secondary particle size) of the abrasive grains is 0.05 μm or more and 10 μm or less, 0.2 μm or more and 4 μm or less, and 0.2 μm or more and 3 μm or less.

In the present description, the volume average particle size of the abrasive grains is defined as the particle size at a 50% cumulative value (D50) in a volume-based particle size distribution. D50 of the abrasive grains can be measured by utilizing a commercial particle size analyzer. Such a particle size analyzer may be based on any techniques such as dynamic light scattering method, laser diffraction method, laser scattering method, or pore electric resistance method. Examples of the D50 measurement method and measuring device include the measurement method and the measuring device described in examples.

The lower limit of the content of the abrasive grains in the polishing composition, relative to the total mass of the polishing composition, is preferably 0.1 mass % or more, more preferably 1 mass % or more, further preferably 5 mass % or more, particularly preferably 7 mass % or more, and most preferably 10 mass % or more. When a content of the abrasive grains is 0.1 mass % or more, the machining capacity is suitably controlled, and an object to be polished can be well polished in both of the rough polishing and the finish polishing.

The upper limit of the content of the abrasive grains in the polishing composition, relative to the total mass of the polishing composition, is preferably 50 mass % or less, more preferably 35 mass % or less, further preferably 30 mass % or less, particularly preferably 20 mass % or less, and most preferably 15 mass % or less. When a content of the abrasive grains is 50 mass % or less, a low-defect surface with small roughness can be obtained in addition to the reduction in production costs of the polishing composition.

In a preferable embodiment, the abrasive grains are contained at 5 mass % or more and 30 mass % or less, relative to the total mass of the polishing composition.

[Water]

The polishing composition according to the present embodiment contains water. For the water, it is preferable for water not to contain impurities as much as possible from the viewpoint of preventing the obstruction of actions of other components, and specifically pure water and ultrapure water obtained by removing impurity ions using an ion exchange resin, and then removing foreign matters through a filter, or distilled water, are preferable.

The lower limit of the content of water in the polishing composition, relative to the total mass of the polishing composition, is preferably 1 mass % or more, more preferably 5 mass % or more, further preferably 10 mass % or more, particularly preferably 15 mass % or more, and most preferably 20 mass % or more. The upper limit of the content of water in the polishing composition, relative to the total mass of the polishing composition, is preferably 90 mass % or less, more preferably 85 mass % or less, further preferably 80 mass % or less, particularly preferably 75 mass % or less, and most preferably 70 mass % or less. That is, the content of water in the polishing composition is preferably 1 mass % or more and 90 mass % or less, more preferably 5 mass % or more and 85 mass % or less, further preferably 10 mass % or more and 80 mass % or less, particularly preferably 15 mass % or more and 75 mass % or less, and most preferably 20 mass % or more and 70 mass % or less. When a content of water is within the above ranges, the machining capacity enhances, and an object to be polished can be well polished in both of the rough polishing and the finish polishing.

[Hydrophobic Dispersing Medium]

The polishing composition according to the present embodiment contains a hydrophobic dispersing medium. The hydrophobic dispersing medium contains at least one selected from the group consisting of normal paraffin hydrocarbons, isoparaffin hydrocarbons, naphthenic hydrocarbons, and terpene hydrocarbons, and has a vapor pressure at 20° C. of 0.004 kPa or more and 2 kPa or less, and/or a flash point of 30° C. or more and 100° C. or less. Hereinbelow, normal paraffin hydrocarbons, isoparaffin hydrocarbons, naphthenic hydrocarbons, and terpene hydrocarbons that may be contained in the hydrophobic dispersing medium may be termed as the "organic solvent". It is preferable that the hydrophobic dispersing medium and organic solvents in the present embodiment are not easily soluble in water. The hydrophobic dispersing medium and the organic solvents may be commercial products or may be synthetic products. Additionally, the vapor pressure at 20° C. herein is also written as "vapor pressure (20° C.)".

Normal paraffin hydrocarbon, isoparaffin hydrocarbon, naphthenic hydrocarbon, and terpene hydrocarbon are preferably derived from mineral oils, may be those obtained by extracting and purifying components derived from mineral oils, or may be those synthesized using components derived from mineral oils as raw materials (synthetic hydrocarbons derived from mineral oils). Normal paraffin hydrocarbon, isoparaffin hydrocarbon, naphthenic hydrocarbon, and terpene hydrocarbon are more preferably synthetic hydrocarbons derived from mineral oils. These hydrophobic organic solvents are known to have generally lower toxicity than other halogenated and benzene organic solvents, and higher volatility than other polyethylene glycol, and the like.

Examples of normal paraffin hydrocarbon include linear hydrocarbons having about 5 or more and about 30 or less carbon atoms, liquid paraffin, kerosene, and diesel oil.

Examples of isoparaffin hydrocarbon include branched hydrocarbons having about 5 or more and about 40 or less carbon atoms and liquid isoparaffin.

Example of naphthenic hydrocarbon include cyclic hydrocarbons having about 5 or more and about 40 or less carbon atoms like monocyclic cycloparaffins such as cyclohexane, cyclopentane, and cyclononane; polycyclic cycloparaffins cycloparaffins as such as decalin; alkyl such methylcyclopentane, methylcyclohexane, 1-methyl-4-isopropylcyclohexane, butylcyclohexane, and methyldecalin.

Examples of terpene hydrocarbon include chain terpene hydrocarbon such as myrcene, farnesene, and citral; and cyclic terpene hydrocarbons such as menthol, cineole, pinene, limonene, α-terpinene, γ-terpinene, camphene, phellandrene, terpinene, terpinolene, p-cymene, and cedrene.

The hydrophobic dispersing medium may further contain organic solvents other than the above hydrocarbons as long as they have a flash point that satisfies the above ranges and do not affect the effects of the present invention. Hereinbelow, organic solvents other than normal paraffin hydrocarbon, isoparaffin hydrocarbon, naphthenic hydrocarbon, and terpene hydrocarbon are termed as the "other organic solvents". Examples of such other organic solvents include methyl alcohol, ethyl alcohol, isopropyl alcohol, acetone, diethyl ether, ethyl acetate, butyl acetate, triethyl citrate, acetyl tributyl citrate, and acetyl triethyl citrate.

The hydrophobic dispersing medium (organic solvent) generally has a flash point. The flash point is, when a liquid is heated at a constant temperature rise, the lowest temperature at which there will be enough concentration of a vapor caused to instantaneously induce ignition when a flame is applied. The flash point can also be considered the lowest temperature at which the hydrophobic dispersing medium volatiles and forms a flammable mixture with air. For the measurement of the flash point, there are various methods depending on the purpose of measurement and properties of a sample. Flash point measurement method includes the closed cup method and the open cup method. The closed cup method uses, for example, tag closed-cup method (JIS K 2265-1:2007), seta closed-cup method (JIS K 2265-2:2007), and Pensky-Martens closed cup method (JIS K 2265-3: 2007), and the like. The open cup method uses Cleveland open cup method (JIS K 2265-4:2007), and the like.

In an embodiment of the present invention, the hydrophobic dispersing medium has a flash point of 30° C. or more and 100° C. or less. When a flash point of the hydrophobic dispersing medium is 30° C. or more, it prevents excess volatilization of the hydrophobic dispersing medium when polishing thereby preventing to maintain the liquid film formed at the polishing interface and the polishing proceeds well, whereby expected effects of the present invention can be demonstrated. When a flash point of the hydrophobic dispersing medium is 100° C. or less, it prevents that the hydrophobic dispersing medium does not volatilize when polishing thereby causing the liquid film formed at the polishing interface to be thick and the abrasive grains to fail to machine a coating film, whereby expected effects of the present invention can be demonstrated.

The hydrophobic dispersing medium may be composed only of one organic solvent, and may be composed of a mixture of two or more organic solvents as long as these have flash points of 30° C. or more and 100° C. or less. That is, in an embodiment, the hydrophobic dispersing medium contains at least two organic solvents selected from the group consisting of normal paraffin hydrocarbons, isoparaffin hydrocarbons, naphthenic hydrocarbons, and terpene hydrocarbons. It should be noted that the "contains at least two organic solvents" encompasses, for example, a case where two or more isoparaffin hydrocarbons are contained. In the present invention, even when the hydrophobic dispersing medium contains two or more organic solvents, the flash point (FPI flash point to be described later) of the hydrophobic dispersing medium is 30° C. or more and 100° C. or less. In the present description, when the hydrophobic dispersing medium is composed of one organic solvent, the flash point of the hydrophobic dispersing medium means a flash point measured by any of the above methods. Further, in the present description, when the hydrophobic dispersing medium contains two or more organic solvents, the flash point of the hydrophobic dispersing medium means a flash point calculated from the Flash-Point Blending Index (abbreviated as FPI) (hereinafter, also referred to as "FPI flash point").

The Flash-Point Blending Index for calculating an FPI flash point can be determined from the Flash-Point Blending Index Table described in Hydrocarbon Processing & Petroleum Refiner, June 1963, Vol. 42, No. 6. For example, a flash point of a mixture when oil A having a flash point of 190° F. (87.8° C.) and oil B having a flash point of 330° F. (165.6° C.) are mixed in a capacity ratio of 30:70 is calculated as follows. Based on the Flash-Point Blending Index Table described in the above literature, FPI of oil A is 30, and FPI of oil B is 1.0. When FPI of the mixture is calculated based on FPI of each oil, "mixture FPI=(30/100)×(30)+(70/100)×(1.0)=9.7". When this FPI 9.7 is applied to the Flash-Point Blending Index, a flash point equivalent to FPI 9.7 is presumably about 230° F. (110° C.). In the case of using two or more organic solvents in mixture, a flash point of the mixture may actually be measured, but some circumstances do not allow the measurement. In such a case, a flash point of the mixture can be calculated by the Flash-Point Blending Index. In the present invention, the calculation method of a flash point when the hydrophobic dispersing medium contains two or more organic solvents is the method of calculating from the Flash-Point Blending Index.

In an embodiment of the present invention, the hydrophobic dispersing medium has the lower limit of the flash point of preferably 30° C. or more. Further, the hydrophobic dispersing medium has the lower limit of the flash point of preferably 40° C. or more, more preferably 50° C. or more, further preferably 55° C. or more, furthermore preferably 64° C. or more, particularly preferably 65° C. or more, and most preferably 66° C. or more. A flash point of 40° C. or more can even further efficiently provide the expected effects of the present invention. Further, in an embodiment of the present invention, the hydrophobic dispersing medium has the upper limit of the flash point of preferably 100° C. or less. Further, the hydrophobic dispersing medium has the upper limit of the flash point of preferably 95° C. or less, more preferably 90° C. or less, further preferably 85° C. or less, furthermore preferably 80° C. or less, particularly preferably less than 75° C., and most preferably 70° C. or less. A flash point of 95° C. or less can even further efficiently provide the expected effects of the present invention.

That is, in an embodiment of the present invention, the hydrophobic dispersing medium has a flash point of 30° C. or more and 100° C. or less. In an embodiment of the present invention, when a vapor pressure (20° C.) of the hydrophobic dispersing medium is 0.004 kPa or more and 2 kPa or less, the flash point of the hydrophobic dispersing medium is preferably 30° C. or more and 100° C. or less. Further, in an embodiment of the present invention, the flash point of the hydrophobic dispersing medium is preferably 40° C. or more and 95° C. or less, more preferably 50° C. or more and 90° C. or less, further preferably 55° C. or more and 85° C. or less, furthermore preferably 64° C. or more and 80° C. or less, particularly preferably 65° C. or more and less than 75° C., and most preferably 66° C. or more and 70° C. or less. Additionally, in an embodiment, the hydrophobic dispersing medium has a flash point of 50° C. or more and 80° C. or less. In an embodiment, the hydrophobic dispersing medium has a flash point of 64° C. or more and 74° C. or less.

When the rough polishing is carried out using the polishing composition of the present embodiment, the flash point of the hydrophobic dispersing medium is 30° C. or more and 100° C. or less, but in an embodiment, it is preferably 40° C. or more and 100° C. or less, more preferably 50° C. or more and 80° C. or less, and further preferably 60° C. or more and 70° C. or less. Further, when the finish polishing is carried out using the polishing composition of the present embodiment, the flash point of the hydrophobic dispersing medium is 30° C. or more and 100° C. or less, but in an embodiment, it is preferably 40° C. or more and 100° C. or less, more preferably 50° C. or more and 75° C. or less, and further preferably 60° C. or more and 70° C. or less.

In a preferable embodiment of the present invention, the hydrophobic dispersing medium contains at least two of the following organic solvents;

first organic solvent having a flash point of 10° C. or more and 45° C. or less second organic solvent having a flash point of more than 45° C. and 65° C. or less (preferably 50° C. or more and 65° C. or less)

third organic solvent having a flash point of more than 65° C. and less than 100° C. (preferably 70° C. or more and 90° C. or less)

forth organic solvent having a flash point of 100° C. or more and 180° C. or less.

The combination of two or more of the above first to forth organic solvents can easily prepare the hydrophobic dispersing medium having a flash point (FPI flash point) of 30 to 100° C. For example, in an embodiment, the hydrophobic dispersing medium can be obtained by mixing the first organic solvent (for example, 5 mass % or more and 15 mass % or less relative to the total mass of the hydrophobic dispersing medium) and the second organic solvent (for example, 85 mass % or more and 95 mass % or less relative to the total mass of the hydrophobic dispersing medium). Additionally, in another embodiment, the hydrophobic dispersing medium can be obtained by mixing the second organic solvent (for example, 70 mass % or more and 90 mass % or less relative to the total mass of the hydrophobic dispersing medium) and the fourth organic solvent (for example, 10 mass % or more and 30 mass % or less relative to the total mass of the hydrophobic dispersing medium). Further in another embodiment, the hydrophobic dispersing medium can be obtained by mixing the third organic solvent (for example, 70 mass % or more and 90 mass % or less relative to the total mass of the hydrophobic dispersing medium) and the fourth organic solvent (for example, 10 mass % or more and 30 mass % or less relative to the total mass of the hydrophobic dispersing medium). Further in another embodiment, the hydrophobic dispersing medium can be obtained by mixing the first organic solvent (for example, 5 mass % or more and 15 mass % or less relative to the total mass of the hydrophobic dispersing medium), the second organic solvent (for example, 55 mass % or more and 85 mass % or less relative to the total mass of the hydrophobic dispersing medium), and the forth organic solvent (for example, 10 mass % or more and 30 mass % or less relative to the total mass of the hydrophobic dispersing medium).

In an embodiment, the first organic solvent is preferably an organic solvent containing one or more kind selected from isoparaffin hydrocarbon and normal paraffin hydrocarbon. In an embodiment, the second organic solvent is preferably an organic solvent containing isoparaffin hydrocarbon. In an embodiment, the third organic solvent is preferably an organic solvent containing one or more selected from isoparaffin hydrocarbon and naphthenic hydrocarbon. In an embodiment, the fourth organic solvent is preferably an isoparaffin hydrocarbon solvent. In an embodiment, the fourth organic solvent is preferably an isoparaffin hydrocarbon solvent. In an embodiment, the fourth organic solvent is preferably an organic solvent containing one or more selected from isoparaffin hydrocarbon and normal paraffin hydrocarbon.

In an embodiment of the present invention, the hydrophobic dispersing medium has a vapor pressure (20° C.) of 0.004 kPa or more and 2 kPa or less. In an embodiment of the present invention, when a flash point of the hydrophobic dispersing medium is 30° C. or more and 100° C. or less, the vapor pressure (20° C.) is preferably 0.004 kPa or more and 2 kPa or less. Additionally, in an embodiment of the present invention, the hydrophobic dispersing medium has a vapor pressure (20° C.) of preferably 0.004 kPa or more, more preferably 0.005 kPa or more, and further preferably 0.010 kPa or more. The vapor pressure of the hydrophobic dispersing medium indicates the easiness in volatility. The higher a vapor pressure, the easier the dispersing medium volatilizes, whereas the lower a vapor pressure, the harder the dispersing medium volatilizes. Generally, the higher a temperature, the higher a vapor pressure, whereas the lower a temperature, the lower a vapor pressure, however, the high-and-low relationship of the vapor pressure at a certain temperature remains largely unchanged regardless of temperature variation. That is, the easiness in volatility of the hydrophobic dispersing medium at a certain temperature is relevant to the vapor pressure of the hydrophobic dispersing medium. When a vapor pressure (20° C.) of the hydrophobic dispersing medium is within the above ranges, the abrasive grains and a liquid amount of the hydrophobic dispersing medium are in the optimal amount at the interface between an object to be polished and a buff when polishing, whereby the machining capacity by the abrasive grains and cleaning property after polishing become good. When a vapor pressure (20° C.) is 0.004 kPa or more, it prevents that the abrasive grains and a liquid amount of the hydrophobic dispersing medium become excessive at the interface between an object to be polished and a buff when polishing, thereby preventing deterioration of cleaning property after polishing due to insufficient process the coating film by the abrasive grains. Regarding the upper limit of the vapor pressure)(20° C., if the hydrophobic dispersing medium excessively volatilizes, the organic solvent becomes short when polishing and the machining capacity by the abrasive grains may not be achieved. For this reason, the hydrophobic dispersing medium has a vapor pressure (20° C.) of preferably 2 kPa or less, more preferably 1.8 kPa or less, further preferably 1.5 kPa or less, and particularly preferably 1.4 kPa or less.

In an embodiment of the present invention, the vapor pressure (20° C.) of the hydrophobic dispersing medium is 0.01 kPa or more and 1.0 kPa or less. Further, in an embodiment of the present invention, the vapor pressure (20° C.) of the hydrophobic dispersing medium is 0.02 kPa or more and 0.5 kPa or less.

The vapor pressure in the present invention refers to, when only one hydrophobic dispersing medium is used, the vapor pressure of such one hydrophobic dispersing medium. When two or more hydrophobic dispersing media are mixed, a partial vapor pressure of each contained hydrophobic dispersing medium can be estimated according to Raoult's law. It is known that estimation is possible by the sum of the partial pressures for a mixed vapor pressure in a mixed state. The mixed vapor pressure in the present invention refers to the sum of the partial pressures of the mixed hydrophobic dispersing media. Specifically, when solvent A having a vapor pressure of 1 kPa and a molecular weight of 100 and solvent B having a vapor pressure of 0.5 kPa and a molecular weight of 200 are mixed in a weight ratio of 1:2, a molar ratio thereof is 1:1 (molar ratio of 0.5:0.5), whereby the mixed vapor pressure is 1 kPa×0.5+0.5 kPa×0.5=0.75 kPa. The molecular weight of the organic solvent shows an average molecular weight, and a raw material manufacturer may disclose molecular weights. When not disclosed, it can be estimated from the information on central number of carbon atoms of the hydrocarbon constituting the organic solvent. Another indicator for the easiness in volatility is a boiling point. Vapor pressure and boiling point are correlated: those having a high vapor pressure have a low boiling point. It should be noted that, for those having a vapor pressure (20° C.) of 0.001 kPa or less, the vapor pressure is considered to be 0.001 kPa in estimation of a mixed vapor pressure.

In an embodiment of the present invention, the hydrophobic dispersing medium has a flash point of 30° C. or more and 100° C. or less and a vapor pressure (20° C.) of 0.004 kPa or more and 2 kPa or less. When the hydrophobic dispersing medium has the above constituent features, the effects of the present invention can be further demonstrated.

In the present invention, when the hydrophobic dispersing medium is composed of two or more organic solvents, the average molecular weight of the organic solvents is preferably 120 to 350, more preferably 140 to 300, further preferably 150 to 290, and particularly preferably 160 to 270.

In the present invention, when the hydrophobic dispersing medium is composed of two or more organic solvents, the vapor pressures (20° C.) of the organic solvents are not particularly limited as long as the vapor pressure can be 0.004 kPa or more and 2 kPa or less when solvents are mixed and, for example, a vapor pressure (20° C.) of the organic solvent may be 0.001 kPa or less (in this case, as described above, a mixed vapor pressure is calculated considering the vapor pressure as 0.001 kPa). When the hydrophobic dispersing medium is composed of two or more organic solvents, the organic solvents have a vapor pressure (20° C.) of preferably 3 kPa or less, and more preferably 2.5 kPa or less.

In a preferable embodiment of the present invention, the hydrophobic dispersing medium contains at least two of the following organic solvents;

- fifth organic solvent having a vapor pressure)(20° C. of 0.01 kPa or more and 0.1 kPa or less
- sixth organic solvent having a vapor pressure (20° C.) of 0.001 kPa or less.

The combination of two or more of the above fifth and sixth organic solvents can easily prepare the hydrophobic dispersing medium having a vapor pressure (20° C.) of 0.004 kPa or more and 2 kPa or less. For example, in an embodiment, the hydrophobic dispersing medium can be obtained by mixing the fifth organic solvent (for example, 60 mass % or more and 95 mass % or less, and preferably 70 mass % or more and 90 mass % or less relative to the total mass of the hydrophobic dispersing medium) and the sixth organic solvent (for example, 5 mass % or more and 40 mass % or less, and preferably 10 mass % or more and 30 mass % or less relative to the total mass of the hydrophobic dispersing medium).

In an embodiment, the fifth organic solvent is preferably an organic solvent containing one or more selected from isoparaffin hydrocarbon and naphthenic hydrocarbon. In an embodiment, the sixth organic solvent is preferably an organic solvent containing normal paraffin hydrocarbon.

In a preferable embodiment of the present invention, the hydrophobic dispersing medium contains at least two of the following organic solvents;

- seventh organic solvent having a vapor pressure (20° C.) of more than 0.001 kPa and less than 0.01 kPa
- eighth organic solvent having a vapor pressure (20° C.) of more than 0.1 kPa and 3 kPa or less (preferably 1.0 kPa or more and 2.5 kPa or less).

The combination of two or more of the above seventh and eighth organic solvents can easily prepare the hydrophobic dispersing medium having a vapor pressure (20° C.) of 0.004 kPa or more and 2 kPa or less. For example, in an embodiment, the hydrophobic dispersing medium can be obtained by mixing the seventh organic solvent (for example, 60 mass % or more and 98 mass % or less, and preferably 70 mass % or more and 95 mass % or less relative to the total mass of the hydrophobic 30 dispersing medium) and the eighth organic solvent (for example, 2 mass % or more and 40 mass % or less, and preferably 5 mass % or more and 30 mass % or less relative to the total mass of the hydrophobic dispersing medium).

In an embodiment, the seventh organic solvent is preferably an organic solvent containing isoparaffin hydrocarbon. In an embodiment, the eighth organic solvent is preferably an organic solvent containing one or more selected from isoparaffin hydrocarbon and normal paraffin hydrocarbon.

In a preferable embodiment of the present invention, the hydrophobic dispersing medium can be obtained by mixing the following organic solvents;

- the hydrophobic dispersing medium containing the sixth organic solvent (for example, 2 mass % or more and 40 mass % or less, and preferably 5 mass % or more and 30 mass % or less relative to the total mass of the hydrophobic dispersing medium) and the seventh organic solvent (for example, 60 mass % or more and 98 mass % or less, and preferably 70 mass % or more and 95 mass % or less relative to the total mass of 20 the hydrophobic dispersing medium)
- the hydrophobic dispersing medium containing the sixth organic solvent (for example, 2 mass % or more and 40 mass % or less, and preferably 5 mass % or more and 30 mass % or less relative to the total mass of the hydrophobic dispersing medium) and the eighth organic solvent (for example, 60 mass % or more and 98 mass % or less, and preferably 70 mass % or more and 95 mass % or less relative to the total mass of the hydrophobic dispersing medium)
- the hydrophobic dispersing medium containing the fifth organic solvent (for example, 60 mass % or more and 98 mass % or less, and preferably 65 mass % or more and 95 mass % or less relative to the total mass of the hydrophobic dispersing medium) and the eighth organic solvent (for example, 2 mass % or more and 40 mass % or less, and preferably 5 mass % or more and 35 mass % or less relative to the total mass of the hydrophobic dispersing medium).

In a preferable embodiment of the present invention, the hydrophobic dispersing medium contains isoparaffin hydrocarbon. In an embodiment, isoparaffin hydrocarbon is contained in the hydrophobic dispersing medium at 50 mass % or more, relative to the total mass of the hydrophobic dispersing medium. In an embodiment, isoparaffin hydrocarbon is contained in the hydrophobic dispersing medium at preferably 55 mass % or more, more preferably 60 mass % or more, further preferably 65 mass % or more, particularly preferably 70 mass % or more, and most preferably 75 mass % or more, relative to the total mass of the hydrophobic dispersing medium. The upper limit of the content of isoparaffin hydrocarbon in the hydrophobic dispersing medium may be 100 mass %, and in an embodiment, it may be 99 mass % or less, 98 mass % or less, and 97 mass % or less.

In an embodiment, the hydrophobic dispersing medium contains isoparaffin hydrocarbon and normal paraffin hydrocarbon. In this case, isoparaffin hydrocarbon is contained in hydrophobic dispersing medium at preferably 40 mass % or more and 98 mass % or less, more preferably 50 mass % or more and 97 mass % or less, further preferably 60 mass % or more and 96 mass % or less, particularly preferably 65 mass % or more and 95 mass % or less, and most preferably 70 mass % or more and 93 mass % or less, relative to the total mass of the hydrophobic dispersing medium. Further, normal paraffin hydrocarbon is contained in the hydrophobic dispersing medium at preferably 2 mass % or more and 60 mass % or less, more preferably 3 mass % or more and 50 mass % or less, further preferably 4 mass % or more and 40 mass % or less, particularly preferably 5 mass % or more and 35 mass % or less, and most preferably 7 mass % or more and 30 mass % or less, relative to the total mass of the hydrophobic dispersing medium.

In an embodiment, the hydrophobic dispersing medium contains isoparaffin hydrocarbon and naphthenic hydrocarbon. In this case, isoparaffin hydrocarbon is contained in the hydrophobic dispersing medium at preferably 5 mass % or more and 80 mass % or less, more preferably 10 mass % or more and 75 mass % or less, further preferably 15 mass % or more and 70 mass % or less, particularly preferably 20 mass % or more and 60 mass % or less, and most preferably 25 mass % or more and 50 mass % or less, relative to the total mass of the hydrophobic dispersing medium. Additionally, naphthenic hydrocarbon is contained in the hydrophobic dispersing medium at preferably 2 mass % or more and 95 mass % or less, more preferably 25 mass % or more and 90 mass % or less, further preferably 30 mass % or more and 85 mass % or less, particularly preferably 40 mass % or more and 80 mass % or less, and most preferably 50 mass % or more and 75 mass % or less, relative to the total mass of the hydrophobic dispersing medium. Further, in an embodiment, isoparaffin hydrocarbon is contained in the hydrophobic dispersing medium at preferably 40 mass % or more and 97 mass % or less, more preferably 50 mass % or more and 95 mass % or less, further preferably 60 mass % or more and 94 mass % or less, particularly preferably 65 mass % or more and 92 mass % or less, and most preferably 70 mass % or more and 90 mass % or less, relative to the total mass of the hydrophobic dispersing medium. Furthermore, naphthenic hydrocarbon is contained in the hydrophobic dispersing medium at preferably 3 mass % or more and 60 mass % or less, more preferably 5 mass % or more and 50 mass % or less, further preferably 6 mass % or more and 40 mass % or less, particularly preferably 8 mass % or more and 35 mass % or less, and most preferably 10 mass % or more and 30 mass % or less, relative to the total mass of the hydrophobic dispersing medium.

In an embodiment, the hydrophobic dispersing medium contains normal paraffin hydrocarbon and naphthenic hydrocarbon. In this case, normal paraffin hydrocarbon is contained in the hydrophobic dispersing medium at preferably 40 mass % or more and 97 mass % or less, more preferably 50 mass % or more and 95 mass % or less, further preferably 60 mass % or more and 94 mass % or less, particularly preferably 65 mass % or more and 92 mass % or less, and most preferably 70 mass % or more and 90 mass % or less, relative to the total mass of the hydrophobic dispersing medium. Additionally, naphthenic hydrocarbon is contained in the hydrophobic dispersing medium at preferably 3 mass % or more and 60 mass % or less, more preferably 5 mass % or more and 50 mass % or less, further preferably 6 mass % or more and 40 mass % or less, particularly preferably 8 mass % or more and 35 mass % or less, and most preferably 10 mass % or more and 30 mass % or less, relative to the total mass of the hydrophobic dispersing medium.

It is known that benzene organic solvents and halogenated organic solvents known as the organic solvent are highly toxic to human body. Benzene organic solvent and halogenated organic solvent are compatible with a coated surface, and an amount of the polishing composition present at the interface between a buff and a coated surface is easy to control, however, polishing a coated surface of a car, and the like, is usually carried out by human hand which raises concerns about the toxicity to polishing workers, whereby it is desirable that such an organic solvent be not used. For example, according to Japanese laws, use environments, wearing personal protection equipment, operating environment management, and the like are required by The Ordinance on Prevention of Organic Solvent Poisoning, and the like. The benzene solvent means an aromatic hydrocarbon solvent. Examples of benzene solvent include toluene, xylene, trimethylbenzene, ethylbenzene, and naphthalene, and representative examples of the organic solvent containing a benzene organic solvent include mineral spirits. The halogenated organic solvent means a halogen-substituted hydrocarbon. Representative examples of the halogenated organic solvent include dichloroethane, trichloroethylene, and tetrachloroethylene.

From the above, in the present invention, it is preferable that the hydrophobic dispersing medium does not contain a benzene organic solvent or a halogenated organic solvent as much as possible. That is, the upper limit of the content of a benzene organic solvent and a halogenated organic solvent (total amount of a benzene organic solvent and a halogenated organic solvent) in the hydrophobic dispersing medium is preferably 5 mass % or less, more preferably 3 mass % or less, further preferably 1 mass % or less, particularly preferably 0.7 mass % or less, and most preferably 0.5 mass % or less, relative to the total mass of the hydrophobic dispersing medium. The lower limit of the content of a benzene organic solvent and a halogenated organic solvent is 0 mass %.

The lower limit of the content of the hydrophobic dispersing medium in the polishing composition is preferably 0.5 mass % or more, more preferably 1 mass % or more, further preferably 5 mass % or more, particularly preferably 10 mass % or more, and most preferably 15 mass % or more, relative to the total mass of the polishing composition.

Further, the upper limit of the content of the hydrophobic dispersing medium in the polishing composition is preferably 60 mass % or less, more preferably 55 mass % or less, further preferably 50 mass % or less, particularly preferably 45 mass % or less, and most preferably 40 mass % or less, relative to the total mass of the polishing composition. That is, the content of the hydrophobic dispersing medium in the polishing composition is preferably 0.5 mass % or more and 60 mass % or less, more preferably 1 mass % or more and 55 mass % or less, further preferably 5 mass % or more and 50 mass % or less, particularly preferably 10 mass % or more and 45 mass % or less, and most preferably 15 mass % or more and 40 mass % or less, relative to the total mass of the polishing composition. In a preferable embodiment of the present invention, the content of the hydrophobic dispersing medium is 15 mass % or more and 40 mass %, relative to the total mass of the polishing composition. When a content of the hydrophobic dispersing medium is within the above ranges, the machining capacity enhances, and an object to be polished can be well polished in both of the rough polishing and the finish polishing.

Further, in the polishing composition according to the present embodiment, the volume ratio of the hydrophobic dispersing medium to water (hydrophobic dispersing medium/water) may be, for example, less than 1, 0.7 or less, 0.5 or less, 0.3 or less, and 0.1 or less. Further, the volume ratio of the hydrophobic dispersing medium to water (hydrophobic dispersing medium/water) may be 1 or more, 1.5 or more, 2 or more, 3 or more, 5 or more, and 10 or more. Furthermore, the emulsion type of the polishing composition of the present invention may be an oil-in-water (O/W) emulsion, or a water-in-oil (W/O) emulsion. When a volume ratio of the hydrophobic dispersing medium to water (hydrophobic dispersing medium/water) is small (for example, a case of less than 1), the polishing composition is likely to be an oil-in-water (O/W) emulsion. When a volume ratio of the hydrophobic dispersing medium to water (hydrophobic dispersing medium/water) is large (for example, a case of 1 or more), the polishing composition is likely to be a water-in-oil (W/O) emulsion.

[Surfactant]

It is preferable that the polishing composition according to the present embodiment contains the hydrophobic dispersing medium or a surfactant to disperse or emulsify water. Additionally, the surfactant imparts hydrophilicity to the surface to be polished after polishing and thus gives good cleaning efficiency to the surface to be polished after polishing, whereby stain adhesion and the like to the surface to be polished can also be prevented.

That is, the polishing composition of the present invention, in an embodiment, is a polishing composition containing abrasive grains, water, a hydrophobic dispersing medium, and a surfactant, wherein the hydrophobic dispersing medium contains at least one selected from the group consisting of normal paraffin hydrocarbons, isoparaffin hydrocarbons, naphthenic hydrocarbons, and terpene hydrocarbons, and has a flash point of 30° C. or more and 100° C. or less.

The surfactant contained in the polishing composition of the present invention is one or more selected from the group consisting of anionic surfactants, cationic surfactants, amphoteric surfactants, and nonionic surfactants. Of these, nonionic surfactants are preferable as the surfactant contained in the polishing composition. These surfactants may be used singly, or in a mixture of two or more thereof.

Examples of the anionic surfactant include polyoxyethylene alkyl ether acetate, polyoxyethylene alkyl sulfate, alkyl sulfate, polyoxyethylene alkyl ether sulfate, alkyl ether sulfate, alkylbenzene sulfonate, alkyl phosphate, polyoxyethylene alkyl phosphate, polyoxyethylene sulfosuccinate, alkyl sulfosuccinate, alkyl naphthalene sulfonate, alkyl diphenyl ether disulfonate, and salts thereof.

Examples of the cationic surfactant include alkyltrimethylammonium salt, alkyldimethylammonium salt, alkylbenzyldimethylammonium salt, and alkylamine salt.

Examples of the amphoteric surfactant include alkyl betaine, and alkylamine oxide.

Examples of the nonionic surfactant include polyoxyethylene alkyl ethers such as polyoxyalkylene alkyl ether, sorbitan fatty acid ester, glycerin fatty acid ester, polyoxyethylene fatty acid ester, polyoxyethylene alkyl amine, and alkyl alkanolamide.

When the hydrophobic dispersing medium contains isoparaffin hydrocarbon in the polishing composition of the present invention, the surfactant is preferably polyoxyalkylene alkyl ether (HLB=10 to 14) from the viewpoint of emulsion stability. The value of HLB (Hydrophilic-Lipophilic Balance) herein is the value indicating the degree of affinity of the surfactant to water and an oil (an organic compound insoluble in water). Examples of polyoxyalkylene alkyl ether include polyoxyethylene-adducted alkyl ethers having 10 to 20 carbon atoms such as polyoxyethylene lauryl ether, polyoxyethylene myristyl ether, polyoxyethylene cetyl ether, polyoxyethylene stearyl ether, polyoxyethylene oleyl ether, and polyoxyethylene octyldodecyl ether. The number of moles of polyoxyethylene added by polyoxyalkylene alkyl ether may be the number of moles added so that HLB is 10 to 14.

The content of the surfactant in the polishing composition relative to the total mass of the polishing composition is preferably 0.01 mass % or more, and more preferably 0.1 mass % or more. The content of the surfactant in the polishing composition relative to the total mass of the polishing composition is 3.0 mass % or less, and preferably 2.0 mass % or less. The content of the surfactant is within the above range, the emulsion stability in the polishing composition increases.

[Thickener]

Examples of the thickener include synthetic thickeners such as polyacrylic acid, sodium polyacrylate (for example, completely neutralized product, partially neutralized product, associated alkali-soluble polyacrylic acid (acrylic polymer), and the like), acrylic compound, and urethane compound; cellulose thickeners (semi-synthetic thickeners) such as carboxymethyl cellulose, and carboxyethyl cellulose; natural thickeners such as agar, carrageenan, layered silicate compound, xanthan gum, and gum arabic. When an associated alkali-soluble polyacrylic acid is used, the polyacrylic acid and alkali are used in combination. Example of the alkali include inorganic alkali such as sodium hydroxide, potassium hydroxide, and ammonia, and organic alkali such as triethanolamine. Alkali addition causes polyacrylic acid to demonstrate the thickening action. The thickener may be a Newtonian fluid, or non-Newtonian fluid. The content of the thickener in the polishing composition to the total mass of the polishing composition is preferably 0.1 mass % or more, and more preferably 0.5 mass % or more. The content of the thickener in the polishing composition to the total mass of the polishing composition is preferably 3.0 mass % or less, and more preferably 2.0 mass % or less. When a content of the additive is within the above ranges, the viscosity in the polishing composition enhances thereby preventing the polishing composition liquid from running on a vertical surface such as a door of a car body.

[Additives]

It is preferable that the polishing composition according to the present embodiment contains additives other than the above. Specific examples of such additives include an oil agent, an emulsion stabilizer, a polymeric material, and a pH adjusting agent. These additives may be used singly, or in a mixture of two or more thereof. Additive addition enhances the stability of emulsion.

Examples of the oil agent include synthetic oils such as α-olefin oligomer, polyol ester, phosphate ester, and silicone oil, vegetable fats/oils such as castor oil, soybean oil, coconut oil, linseed oil, cottonseed oil, rapeseed oil, tung oil, and olive oil, and animal fats/oils such as beef tallow, and lanolin.

Examples of the emulsion stabilizer include polyhydric alcohols such as glycerin, ethylene glycol, and propylene glycol, and aliphatic alcohols such as cetyl alcohol, and stearyl alcohol.

The content of the additives in the polishing composition is preferably 0.1 mass % or more, and more preferably 1.0 mass % or more. Further, the content of the additives in the polishing composition is preferably 12.0 mass % or less, and 8.0 mass % or less. When a content of the additives is within the above range, the emulsion stability in the polishing composition increases.

[pH of Polishing Composition]

The polishing composition of the present embodiment is not particularly limited, but the pH can be adjusted by adding an acid or a salt thereof, a base or a salt thereof, to be described below. In an embodiment, the pH of the polishing composition is preferably pH 4 or more and 12 or less, more preferably pH 5 or more and 11 or less, further preferably pH 6 or more and 10 or less, and particularly preferably pH 7 or more and 10 or less.

[Acids or Salts Thereof]

The polishing composition of the present embodiment may contain, as a pH adjusting agent, an acid or a salt thereof.

For the acid, both inorganic acids and organic acids can be used. Examples of the inorganic acid include hydrochloric acid, sulfuric acid, nitric acid, hydrofluoric acid, boric acid, carbonic acid, hypophosphorous acid, phosphorous acid, and phosphoric acid. Examples of the organic acid include formic acid, acetic acid, propionic acid, butyric acid, valeric acid, 2-methylbutyric acid, n-hexanoic acid, 3,3-dimethylbutyric acid, 2-ethylbutyric acid, 4-methylpentanoic acid, n-heptanoic acid, 2-methylhexanoic acid, n-octanoic acid, 2-ethylhexanoic acid, benzoic acid, glycolic acid, salicylic acid, glyceric acid, oxalic acid, malonic acid, succinic acid, glutaric acid, adipic acid, pimelic acid, maleic acid, phthalic acid, malic acid, tartaric acid, citric acid, lactic acid, diglycolic acid, 2-furancarboxylic acid, 2,5-furandicarboxylic acid, 3-furancarboxylic acid, 2-tetrahydrofurancarboxylic acid, methoxyacetic acid, methoxyphenylacetic acid, phenoxyacetic acid, methanesulfonic acid, ethanesulfonic acid, sulfosuccinic acid, benzenesulfonic acid, toluenesulfonic acid, phenylphosphonic acid, and hydroxyethylidene-1,1-diphosphonic acid. Further, examples of the salt include salts of the Group 1 elements, salts of the Group 2 elements, aluminum salts, ammonium salts, amine salts, and quaternary ammonium salts. These acids or salts thereof can be used singly, or in a mixture of two or more thereof. Of these, nitric acid and citric acid are preferable.

[Bases or Salts Thereof]

The polishing composition of the present embodiment may contain, as a pH adjusting agent, a base or a salt thereof. Examples of the base or a salt thereof include amines such as aliphatic amine, and aromatic amine, organic bases such as quaternary ammonium hydroxide, alkali metal hydroxides such as sodium hydroxide, and potassium hydroxide, hydroxides of the Group 2 elements such as magnesium hydroxide, and calcium hydroxide, and ammonia.

[Other Components]

The polishing composition of the present embodiment may further optionally contain other components such as an oxidizing agent to oxidize the surface of an object to be polished, a water-soluble polymer to act on the surface of an object to be polished and the surface of abrasive grains, an anticorrosive and a chelating agent for preventing an object to be polished from corroding, an antiseptic agent, an antifungal agent, a polymeric material that have other functions.

Examples of the oxidizing agent include hydrogen peroxide, peracetic acid, percarbonate, urea peroxide, perchlorate, and persulphate.

Examples of the water-soluble polymer include polysulfonic acids such as polyphosphonic acid, and polystyrenesulphonic acid, polysaccharides such as xanthan gum, and sodium alginate, cellulose derivatives such as hydroxyethyl cellulose, polyethylene glycol, polyvinyl alcohol, polyvinyl pyrrolidone, alkylolammonium salt, polyoxyethylene alkylphenyl ether, sorbitan monooleate, and oxyalkylene polymers having a single or plural kinds of oxyalkylene units. Additionally, the salts of the above compounds can suitably be used as the water-soluble polymer.

Examples of the anticorrosive include amines, pyridines, tetraphenylphosphonium salt, benzotriazoles, triazoles, tetrazoles, and benzoic acid. Examples of the chelating agent include carboxylic acid chelating agents such as gluconic acid, amine chelating agents such as ethylenediamine, diethylenetriamine, and trimethyltetramine, polyaminopolycarboxylic chelating agents such as ethylenediaminetetraacetic acid, nitrilotriacetic acid, hydroxyethylethylenediaminetriacetic acid, triethylenetetramine hexaacetic acid, and diethylenetriaminepenta acetic acid, organic phosphonic acid chelating agents such as 2-aminoethylphosphonic acid, 1-hydroxyethylidene-1,1-diphosphonic acid, aminotri (methylene phosphonic acid), ethylenediaminetetrakis(methylene phosphonic) acid, diethylenetriamine penta(methylene phosphonic acid), ethane-1,1-diphosphonic acid, ethane-1,1,2-triphosphonic acid, methane hydroxyphosphonic acid, and 1-phosphonobutane-2,3,4-tricarboxylic acid, phenol derivatives, and 1,3-diketone.

Examples of the antiseptic agent include sodium hypochlorite. Examples of the antifungal agent include oxazolines such as oxazolidine-2,5-dione.

[Method for Producing Polishing Composition]

The method for producing the polishing composition of the present embodiment comprises

- a step of providing a hydrophobic dispersing medium containing at least one selected from the group consisting of normal paraffin hydrocarbons, isoparaffin hydrocarbons, naphthenic hydrocarbons, and terpene hydrocarbons, and having a vapor pressure at 20° C. of 0.004 kPa or more and 2 kPa or less, and/or a flash point of 30° C. or more and 100° C. or less, and
- a step of mixing the hydrophobic dispersing medium, water, and abrasive grains. Such a production method enables the production of the polishing composition capable of providing expected effects of the present invention. That is, the present invention accordingly provides the method for producing the polishing composition.

When the hydrophobic dispersing medium contains two or more compounds, the step of providing the hydrophobic dispersing medium in the method for producing the polishing composition of the present embodiment includes a step of mixing two or more organic solvents selected from the group consisting of normal paraffin hydrocarbons, isoparaffin hydrocarbons, naphthenic hydrocarbons, and terpene hydrocarbons, and adjusting a vapor pressure (20° C.) to be 0.004 kPa or more and 2 kPa or less, and/or, a flash point to be 30° C. or more and 100° C. or less, to obtain the hydrophobic dispersing medium. The method of mixing two or more organic solvents and adjusting a vapor pressure (20° C.) of the hydrophobic dispersing medium to be 0.004 kPa or more and 2 kPa or less, and/or, a flash point to be 30° C. or more and 100° C. or less is not particularly limited and, for example, when a flash point of the hydrophobic dispersing medium is adjusted to be 30° C. or more and 100° C. or less, an amount of each of the organic solvents may be calculated so that a flash point of the hydrophobic dispersing medium to be obtained is 30° C. or more and 100° C. or less based on the flash point of each of the organic solvents and the above FPI flash point, and mixed. For the form of mixing two or more kinds or organic solvents, the forms described in the description on the FPI flash point calculation are applicable. Additionally, for example, when a vapor pressure (20° C.) of the hydrophobic dispersing medium is adjusted to be 0.004 kPa or more and 2 kPa or less, an amount of each of the organic solvents may be calculated so that a vapor pressure (20° C.) of the hydrophobic dispersing medium to be obtained is 0.004 kPa or more and 2 kPa or less based on the vapor pressure of each of the organic solvents, and mixed.

When the polishing composition of the present invention contains a surfactant, it is preferable that the hydrophobic dispersing medium and the surfactant are mixed in advance and then mixed with water and abrasive grains. Further, when the polishing composition of the present invention contains hydrophilic components such as a thickener and an emulsion stabilizer, it is preferable that water and the hydrophilic components are mixed in advance and then mixed with the hydrophobic dispersing medium and the abrasive grains. After the hydrophobic dispersing medium, water, and the abrasive grains are mixed, other components such as a pH adjusting agent are optionally stirred and mixed, whereby the polishing composition of the present embodiment can be obtained.

In each of the above steps, the temperature at which each component is mixed is not particularly limited, and preferably 10° C. or more and 40° C. or less. Further, the mixing time is not particularly limited.

[Object to be Polished]

The object to be polished according to the present embodiment is not particularly limited, and includes at least one selected from the group consisting of alloy materials, resin materials, metals, semi-metals, metal oxides, metal carbides, metal nitrides, semi-metal oxides, semi-metal carbides, semi-metal nitrides, and glass materials, and may further be a composite material of these materials. In particular, resin materials used for a coated surface of a car body, and the like, are preferable.

The polishing composition of the present invention is, in an embodiment, used for the finish polishing of a resin material having a pencil hardness of F or lower. That is, it is preferable that the object to be polished by the polishing composition of the present invention is a resin material having a pencil hardness of F or less.

The alloy herein is a covalent compound in which one or more species of metal elements, or non-metal elements such as carbon, nitrogen, and silicon are allowed to share with one species of a metal element, and produced for the purpose of enhancing properties such as mechanical strengths, chemical resistance, corrosion resistance, heat resistance, and the like, to a pure metal. Of these, an aluminum alloy is lightweight and has excellent strength, for which it is used for various usages such as electric appliances and electronic components, in addition to structural materials such as building materials and containers, and transportation equipment such as cars, vessels, airplanes. Titanium alloy is lightweight and has excellent corrosion resistance, for which it is widely used for precision machinery, ornaments, tools, sport gear, and medical appliances. Stainless steel and nickel alloy, which are iron alloys, have excellent corrosion resistance, for which they are used for various usages such as tools, machinery and appliances, cookware, in addition to structural material and transportation equipment. Copper alloy has excellent electrical conductivity, thermal conductivity, and corrosion resistance with excellent machining capacity and an aesthetic finish, for which it is widely used for ornaments, tableware, parts for musical instruments and electrical materials, and the like. Further, in recent years, materials containing a resin have been increasingly used for the usages described above.

Hereinafter, descriptions will be given on alloy materials, resin materials, materials of metals, semi-metals, and oxides, carbides, and nitrides thereof, and glass materials.

[Alloy Materials]

An alloy material contains a metal species to be the predominant component and a metal species different from the predominant component.

Alloy materials are named based on the metal species to be the predominant component. Examples of the alloy material include aluminum alloy, iron alloy, titanium alloy, nickel alloy, and copper alloy. These alloy materials may be applied singly, or in combinations of two or more thereof. Of these, it is preferable that at least one selected from the group consisting of aluminum alloy and iron alloy is contained. Additionally, it is preferable that an alloy material has a difference in Vickers hardness (HV) of 5 or more between a metal species to be the predominant component and a metal species different from the predominant component.

An aluminum alloy has aluminum as the predominant component and preferably contains at least one selected from the group consisting of magnesium, silicon, copper, zinc, manganese, chromium, and iron, as the metal species different from the predominant component. The lower limit of the content of the above metal species different from the predominant component in an aluminum alloy is not particularly limited, and is preferably 0.1 mass % or more relative to the total aluminum alloy. Further, the upper limit of the content of the above metal species different from the predominant component is not particularly limited, and is preferably 10 mass % or less relative to the total aluminum alloy.

Specific examples of the aluminum alloy include, as described in JIS H4000: 2006, Al—Cu and Al—Cu—Mg aluminum alloys with alloy number 2000 series, Al—Mn aluminum alloy with alloy number 3000 series, Al—Si aluminum alloy with alloy number 4000 series, Al—Mg aluminum alloy with alloy number 5000 series, Al—Mg—Si aluminum alloy with alloy number 6000 series, Al—Zn—Mg aluminum alloy with alloy number 7000 series, and Al—Fe—Mn aluminum alloy with alloy number 8000 series.

An iron alloy has iron as the predominant component and preferably contains at least one selected from the group consisting of chromium, nickel, molybdenum, and manganese, as the metal species different from the predominant component. The lower limit of the content of the above metal species different from the predominant component in an iron alloy is not particularly limited, and is preferably 10 mass % or more relative to the total aluminum alloy. Additionally, the upper limit of the content of the above metal species different from the above predominant component in an iron alloy is not particularly limited, and is preferably 50 mass % or less relative to the total iron alloy.

An iron alloy is preferably a stainless steel. Specific examples of the stainless steel include, according to the codes assigned to kinds as described in JISG4303: 2005, SUS201, SUS303, 303Se, SUS304, SUS304L, SUS304NI, SUS305, SUS305JI, SUS309S, SUS310S, SUS316, SUS316L, SUS321, SUS347, SUS384, SUSXM7, SUS303F, SUS303C, SUS430, SUS430F, SUS434, SUS410, SUS416, SUS420J1, SUS420J2, SUS420F, SUS420C, and SUS631J1.

A titanium alloy has titanium as the predominant component and preferably contains a metal species different from the predominant component such as aluminum, iron, and vanadium. The content of the metal species different from the predominant component in a titanium alloy is, for example, 3.5 mass % or more and 30 mass % or less relative to the total titanium alloy. Examples of the titanium alloy include, according to the species described in JISH4600: 2012, species 11 to 23 titanium alloys, and species 50, 60, 61, and 80 titanium alloys.

A nickel alloy has nickel as the predominant component and contains at least one selected from, for example, iron, chromium, molybdenum, and cobalt as the metal species different from the predominant component. The content of the metal species different from the predominant component in a nickel alloy is, for example, 20 mass % or more and 75 mass % or less, relative to the total nickel alloy. Examples of the nickel alloy include, according to the alloy number described in JISH4551: 2000, NCF600, 601, 625, 750, 800, 800H, 825, NW0276, 4400, 6002, and 6022.

A copper alloy has copper as the predominant component and contains at least one selected from, for example, iron, lead, zinc, and tin as the metal species different from the predominant component. The content of the metal species different from the predominant component in a copper alloy is, for example, 3 mass % or more and 50 mass % or less, relative to the total copper alloy. Examples of the copper alloy include, according to the alloy number described in JISH3100: 2006, C2100, 2200, 2300, 2400, 2600, 2680, 2720, 2801, 3560, 3561, 3710, 3713, 4250, 4430, 4621, 4640, 6140, 6161, 6280, 6301, 7060, 7150, 1401, 2051, 6711, and 6712.

[Resin Material]

The kind of the resin material is not particularly limited and may be either a thermosetting resin or a thermoplastic resin.

Examples of the thermosetting resin include epoxy resin, polyimide resin, phenol resin, amino resin, unsaturated polyester resin, thermosetting polyurethane resin, and melamine resin.

Examples of the thermoplastic resin include halogen-containing resins such as polystyrene resin, acrylonitrile-butadiene-styrene copolymer resin (ABS resin), (meth) acrylic resin (methacryl and/or acrylic resin), organic acid vinylester resin or derivative thereof, vinyl ether resin, halogen-including resins such as polyvinyl chloride, polyvinylidene chloride, and polyvinylidene fluoride, olefin resins such polyethylene, and polypropylene, polycarbonate resin, saturated polyester resins such as polyethylene terephthalate, and polyethylene naphthalate, polyamide resin, thermoplastic polyurethane resin, polysulfone resin (polyether sulfone, polysulfone, and the like), polyphenylene ether resin (2,6-xylenol polymer, and the like), cellulose derivative (cellulose esters, cellulose carbamates, cellulose ethers, and the like), and silicone resin (polydimethylsiloxane, polymethylphenylsiloxane, and the like).

The above resins can be used singly, or in combinations of two or more thereof. Of these resins, a thermoplastic resin is preferable from the viewpoint of the impact resistance and weather resistance, with a polycarbonate resin being more preferable.

An object to be polished containing a resin material may be in the form of, for example, a member formed from a resin material (resin member), or a form of a composite material having a resin coating film on the surface of a metal substrate, or the like, and is not particularly limited. Examples of the resin used for a coating film include thermosetting polyurethane resin, and (meth)acrylic resin. The resin coating film may be a clear coating film. The polishing composition according to the present invention is preferably used for a resin coating film having a pencil hardness of preferably H or less, and more preferably F or less, measured by the Pencil method described in JIS K 5600-5-4 (1999).

The composite material having a resin coating film is not particularly limited, and an example of a three-dimensional resin material can be given. Examples of the usage of the three-dimensional resin material include car body, railroad car, airplane, and resin member. A resin coating film covering the surface of a car body has a large area and curved surfaces, but the polishing composition of the present embodiment is suitable for polishing the outer surface of such a resin coating film.

[Metal, Semi-Metal, and Oxide, Carbide, and Nitride Thereof]

Examples of the metal include aluminum, iron, zirconium, copper, nickel, gold, silver, bismuth, manganese, and zinc.

Examples of the semi-metal species include the Group IV semiconductors such as silicon (Si), and germanium (Ge), the Groups II to VI compound semiconductors such as zinc selenide (ZnSe), cadmium sulfide (CdS), and zinc oxide (ZnO), the Groups III-V compound semiconductors such as gallium arsenide (GaAs), indium phosphide (InP), and gallium nitride (GaN), the Group IV compound semiconductors such as silicon carbide (SiC), and silicon germanium (SiGe), and chalcopyrite semiconductors such as copper·indium·selenium ($CuInSe_2$).

Additionally, the polishing composition can also be used suitably for oxides, carbides, and nitrides of these materials.

[Glass Material]

Examples of the glass material include soda-lime glass, quartz glass, tempered glass, crystallized glass, aluminosilicate glass, and glassy carbon.

[Polishing Method]

The polishing composition of the present embodiment is suitably used for polishing, as described above, an object to be polished containing a composite material, a resin material, a metal, a semi-metal, a metal oxide, a metal carbide, a metal nitride, a semi-metal oxide, a semi-metal carbide, a semi-metal nitride, or a glass material, and further a composite material of these materials.

The polishing composition of the present embodiment is suitable for polishing an object to be polished having curved surfaces to be polished (for example, a coated surface of a car body such as a car). Accordingly, the present invention also provides a polishing method including polishing an object to be polished using the polishing composition of the present embodiment. That is, the present invention accordingly provides a polishing method including polishing a coated surface with a wool buff and/or a sponge buff using the above polishing composition, or the polishing composition obtained by the above production method. An embodiment accordingly provides a polishing method including polishing a coated surface with a wool buff using the polishing composition of the present embodiment. Further, another embodiment accordingly provides a polishing method including polishing a coated surface with a sponge buff using the polishing composition of the present embodiment.

Hereinafter, a method for polishing a resin-coated surface will be described as an example of the polishing method of the present embodiment. The polishing apparatus configuration for carrying out polishing is not particularly limited, and general polishing apparatuses such as a hand-held polisher, a single-side polisher, a double-side polisher, and a lens polisher may be used, and an automatic polishing apparatus shown in FIG. 1 of International Publication No. WO 2019/066014 (a polishing pad 10 of FIG. 1 corresponds to polishing buff) may also be used.

For example, the polishing method of the present embodiment may also be applied when a polishing buff is mounted to the tip of a hand polisher and a polishing worker moves the hand polisher by hand to polish a resin-coated surface. The driving means of a hand polisher is not particularly limited, and generally single action, double action, gear action, and the like, are used, and double action is preferable for polishing a coating member.

When an object to be polished such as an alloy material is polished using the polishing composition of the present embodiment, the polishing can be carried out using an apparatus and conditions typically used for polishing metals. With a single-side polishing apparatus, an object to be polished (preferably, a substrate to be polished) is held using a holder called a carrier, and a platen to which a polishing cloth is attached is pressed against one side of the object to be polished while supplying the polishing composition thereby to polish the one side of the object to be polished by rotating the platen. With a double-side polishing apparatus, an object to be polished is held using a holder called a carrier, and platens to which a polishing cloth is attached are pressed against the opposing sides of the object to be polished while supplying the polishing composition from above thereby to polish both sides of the object to be polished by rotating them in relative directions. During this operation, the polishing is achieved by the physical action caused by the friction between the polishing pad and the polishing composition and the object to be polished, and the chemical action caused by the polishing composition to the object to be polished.

Examples of the polishing condition in the polishing method according to the present embodiment include a polishing load. Generally, the higher a load, the higher a frictional force by the abrasive grains and the mechanical machining capacity enhances, thereby increasing the polishing speed. The lower limit of the polishing load in the polishing method according to the present embodiment is not particularly limited, and is preferably 10 g/cm$^2$ or more, and more preferably 18 g/cm$^2$ or more. As a polishing load increases, the mechanical machining capacity enhances, thereby increasing the polishing speed. The upper limit of the polishing load is preferably 1000 g/cm$^2$ or less, and more preferably 500 g/cm$^2$ or less. As a polishing load decreases, surface roughness of a polishing surface is reduced.

Further, examples of the polishing conditions in the polishing method according to the present embodiment include a linear velocity (polishing linear velocity) during polishing. Generally, the number of rotation of a polishing pad, the number of rotation of a carrier, the size of an object to be polished, and the number of objects to be polished, and the like, affect the linear velocity, but a frictional force applying onto an object to be polished is large when a linear velocity is high, whereby the object to be polished is mechanically polished with ease. Additionally, a frictional heat generated by friction may increase the chemical action by the polishing composition. The lower limit of the polishing linear velocity in the polishing method according to the present embodiment is not particularly limited, and is preferably 10 m/min or more, and more preferably 20 m/min or more. The upper limit of the polishing linear velocity is preferably 1000 m/min or less, and more preferably 500 m/min or less. Within this range, a sufficiently high polishing speed can be achieved, and also a moderate frictional force onto an object to be polished can be imparted. That is, in the present embodiment, the polishing linear velocity is preferably 10 m/min or more and 1000 m/min or less, and more preferably 20 m/min or more and 500 m/min or less.

The polishing composition of the present embodiment may be used in a step that is completed in one process, or may be used in one or more processes of a step having plural numbers of polishings. For example, the polishing composition used in a step having three-process polishings can be used in any one or more processes of the first process to be the rough polishing, second process to be the middle polishing, and the third process to be the finish polishing.

When an object to be polished is polished using the polishing composition of the present embodiment, the polishing composition used for polishing once can be retrieved and re-used for polishing. An example of the method for re-using the polishing composition is a method in which the polishing composition discharged from a polishing apparatus is retrieved into a tank, re-circulated into the polishing apparatus to be used. Recycle-use of the polishing composition is useful in an aspect of reducing the environmental impact by a decreased amount of the polishing composition discharged as a waste liquid and reducing the production cost for polishing an object to be polished by reducing an amount of the polishing composition to be used.

When the polishing composition of the present embodiment is recycle-used, the abrasive grains and a part or all of other additives consumed and lost by polishing can be added during recycle-use as a composition adjuster. In this case, the composition adjuster may be a mixture in which the abrasive grains and a part or all of other additives are mixed in any mixing ratio. The additional addition of the composition adjuster adjusts the composition of the polishing composition to be preferable for re-use and maintains suitable polishing. The concentration of abrasive grains and other additives contained in the composition adjuster is not particularly limited and any concentration is possible, and is preferably, suitably adjusted in accordance with the size of a circulation tank and polishing conditions.

The polishing composition of the present embodiment may be one-part type, or two- or multi-part type. Further, the polishing composition of the present embodiment may be prepared by, for example, diluting an undiluted solution of the polishing composition 10-fold or more with a diluent such as water or an oil.

The polishing buff used in the polishing method using the polishing composition of the present embodiment may be formed of materials such as wool type, polyurethane type, foamed polyurethane type, non-woven type, and suede type.

EXAMPLES

The present invention will be described in further detail with reference to the following examples and comparative examples. However, the technical scope of the present invention is not limited to the following examples. It should be noted that the "%" and "part" mean respectively "mass %" and "part by mass", unless otherwise stated. Additionally, in the following examples, the operation was carried out under the conditions of room temperature (20° C. or more and 25° C. or less)/relative humidity 30% RH or more and 50% RH or less, unless otherwise stated.

(Preparation of Polishing Compositions of Examples 1 to 11 and Comparative Examples 1 to 3)

Polyoxyalkylene alkyl ether (surfactant) having an HLB of 13.3 was added in the amount shown in Table 1 to the kinds and amounts of the organic solvents shown in Table to prepare the solutions of hydrophobic dispersing medium. Subsequently, 0.95 mass % of a polyacrylic acid macromolecule (thickener) and 2.0 mass % of glycerin (emulsion stabilizer) were mixed with water, the solution was added to the solution of the hydrophobic dispersing medium and stirred at room temperature (25° C.), and then the aluminum oxide as the abrasive grain was added in the amounts shown in Table 1. To the obtained dispersion, 0.1 mass % of an antiseptic agent was added, and sodium hydroxide as alkali was added thereto to adjust to pH 9.0, thereby obtaining each of the O/W emulsion polishing compositions of Examples 1 to 11 and Comparative Examples 1 to 3. It should be noted that the content of water is the balance of the total amount of each of the above components, when the polishing composition is 100 mass %.

"–" shown in Table 1 means that the organic solvent is not contained; the content of each component in each polishing composition is a content relative to the total mass of the polishing composition; and the balance is water (containing sodium hydroxide). In Table 1, the "average particle size" of the abrasive grains (aluminum oxide) in each of the polishing compositions shows an average secondary particle size, the "FPI converted flash point" shows a flash point converted from FPI (Flash-Point Blending Index), the "total content of benzene and halogenated organic solvents shows a total content of benzene and halogenated organic solvents relative to the total hydrophobic dispersing medium. Further, the "mixed vapor pressure" in Tables 1 to 3 means the vapor pressure at 20° C.

The abrasive grains and organic solvents shown in Table 1 used were as follows.

<Abrasive Grains>

Any of the following 3 kinds was used as the abrasive grain.

Aluminum oxide: α-conversion rate 95%, average secondary particle size (D50) 0.6 μm Aluminum oxide: α-conversion rate 95%, average secondary particle size (D50) 1.4 μm Aluminum oxide: α-conversion rate 95%, average secondary particle size (D50) 2.6 μm.

For measurement of the α-conversion rate of aluminum oxide particles, an X-ray diffractometer (Ultima-IV, manufactured by Rigaku Corporation) was used, and the reference material used was a commercial α alumina single crystal particle calcined at a temperature high enough for α conversion to sufficiently proceed (α-conversion rate: 100%). Integrated d intensities of the (113) plane diffraction line of the reference material and target abrasive grains (aluminum particles) by X-ray diffraction measurement were measured, and a α-conversion rate of the target abrasive grains (aluminum oxide particles) was calculated by the integrated intensity ratio of the (113) plane diffraction line of the target abrasive grains to the reference material.

The average secondary particle size of each abrasive grain (D50) was measured by the laser diffraction/scattering method using Microtrac MT3300EXII (manufactured by MicrotracBEL Corp.)

<Organic Solvent>

Any one or more of the following were used as the organic solvents. The vapor pressure is a value at 20° C.

organic solvent 1 . . . mineral oil-derived synthetic hydrocarbon (a mixture of isoparaffin hydrocarbon and normal paraffin hydrocarbon), flash point: 30° C. (closed cup method), total content of a benzene organic solvent and a halogenated organic solvent of 10 mass % or more, vapor pressure 1.4 kPa (molecular weight 128)

organic solvent 2 . . . mineral oil-derived synthetic hydrocarbon (isoparaffin hydrocarbon), flash point: 63° C. (closed cup method), total content of a benzene organic solvent and a halogenated organic solvent of 0.5 mass % or less, vapor pressure 0.05 kPa (molecular weight 170)

organic solvent 3 . . . mineral oil-derived synthetic hydrocarbon (naphthenic hydrocarbon), flash point: 75° C. (closed cup method), total content of a benzene organic solvent and a halogenated organic solvent of 0.5 mass % or less, vapor pressure 0.023 kPa (molecular weight 170)

organic solvent 4 . . . mineral oil-derived synthetic hydrocarbon (isoparaffin hydrocarbon), flash point: 86° C. (closed cup method), total content of a benzene organic solvent and a halogenated organic solvent of 0.5 mass % or less, vapor pressure 0.006 kPa (molecular weight 184)

organic solvent 5 . . . mineral oil-derived synthetic hydrocarbon (isoparaffin hydrocarbon), flash point: 139° C. (closed cup method), total content of a benzene organic solvent and a halogenated organic solvent of 0.5 mass % or less, vapor pressure 0.001 kPa or less (molecular weight 226)

organic solvent 6 . . . mineral oil-derived synthetic hydrocarbon (normal paraffin hydrocarbon), flash point: 168° C. (open cup method), total content of a benzene organic solvent and a halogenated organic solvent of 0.5 mass % or less, vapor pressure 0.001 kPa or less (molecular weight 268)

(Evaluation on Polishing)

Using the polishing compositions of Examples and Comparative Examples, polishing was carried out under the following polishing conditions to evaluate the machining capacity (grinding margin) and cleaning property in accordance with the following methods.

<Polishing Conditions>

The polisher used for the polishing is double action polisher LHR12E (manufactured by Rupes S.p.A.), and specific polishing conditions are as follows.

(Test Using a Wool Buff)

Buff: wool buff (pile length: about 15 mm)
Pressing load: 4 kg
Number of rotation of polisher: 5300 rpm
Polishing linear velocity: 200 m/min
Flow rate of polishing composition: 0.4 g/15 sec
Polishing time: a clear coating film was dry polished using a #3000 paper, and the time needed to visually confirm the removal
Polishing area: 300×400 mm The object to be polished used is a composite material having a steel plate on the surface of which a clear coating film is coated with a synthetic resin coating material, and a pencil harness of the clear coating film is H.

(Evaluation on Machining Capacity)

Scratch elimination state by the dry polishing using a #3000 paper was visually confirmed and evaluated as follows based on the time required to eliminate scratches.

[Evaluation Criteria]

A . . . Case of less than 150 sec; pass, with excellency
B . . . Case of 150 sec or more and less than 195 sec; pass
C . . . Case of 195 sec or more; machining time is extended; fail.

(Evaluation on Cleaning Property)

After polishing, the clear coating film was wet wiped and dry wiped using a cloth (product name: 3M Finishing wipe 5351, size 36 cm×36 cm), and the time required to remove a remnant on the coating film was measured. Specifically, the evaluation was made as follows based on the time (the total time of the wet wiping and dry wiping) required to visually eliminate abrasive grains and the solution components. It should be noted that an evaluation was made one scale lower in a case where a remnant, when removed, was wiped away with a force more than typically applied even within the time of the evaluation criteria below. Specifically, when the polishing compositions of Examples 1 to 3 were used, the time required to eliminate the abrasive grains and the solution component was within 20 sec, but a force was needed to remove the remnant, whereby the evaluation was down to B.

[Evaluation Criteria]

A . . . Case of less than 20 sec; pass, with excellency
B . . . Case of 20 to 40 sec; pass
C . . . Case of more than 40 sec; wiping time is extended; fail.

(Evaluation Result)

Table 2 shows the evaluation results on the polishing with the wool buff using the polishing compositions of Examples 1 to 11 and Comparative Examples 1 to 3.

[Evaluation on Polishing with Sponge Buff]

(Evaluation on Polishing)

Using the polishing compositions of Examples 1 to 7, 9 to 11 and Comparative Examples 1 to 3, polishing with a sponge buff was carried out under the following polishing conditions. After polishing, the machining capacity (polishing speed), cleaning property, and surface state (surface defect) were evaluated in accordance with the following methods.

<Polishing Conditions>

The polisher used for the polishing is double action polisher LHR12E (manufactured by Rupes S.p.A.), and specific polishing conditions are as follows.

(Test Using a Sponge Buff)

Buff: sponge buff
Pressing load: 4 kg
Number of rotation of polisher: 5300 rpm
Polishing linear velocity: 200 m/min
Flow rate of polishing composition: 0.4 g/45 sec
Polishing time: 45 sec
Polishing area: 300×400 mm The objects to be polished used are composite materials having a steel plate on the surface of which a clear coating film is coated with a synthetic resin coating material, and two of such objects were provided, one with a clear coating film having a pencil hardness of F, and the other with a clear coating film having a pencil hardness of H.

It should be noted that when calculating the machining capacity, the above polishing time was changed to 3 minutes considering the measurement accuracy of a film thickness meter to calculate the machining capacity.

(Evaluation on Machining Capacity)

Using an electromagnetic-inductive film thickness measuring apparatus, film thicknesses of the film before and after polishing were measured, respectively. Then, a grinding margin (polished amount) was calculated from the difference in the film thickness before and after polishing, followed by calculating a polishing speed from the grinding margin. When a polishing speed is 0.7 μm/min or more, scratches caused during car wash, and the like, can be removed, whereby the evaluation was made as a pass.

(Evaluation on Cleaning Property)

After polishing, the clear coating film was wet wiped and dry wiped using a cloth (product name: 3M Finishing wipe 5351, size 36 cm×36 cm), and the time required to remove a remnant on the coating film was measured. Specifically, the evaluation was made as follows based on the time (the total time of the wet wiping and dry wiping) required to visually eliminate abrasive grains and the solution components. It should be noted that an evaluation was made one scale lower in a case where a remnant, when removed, was wiped away with a force more than typically applied even within the time of the evaluation criteria below.

[Evaluation Criteria]

A . . . Case of less than 20 sec; pass, with excellency
B . . . Case of 20 sec or more to 40 sec or less; pass
C . . . Case of more than 40 sec; wiping time is extended; fail.

(Presence or Absence of Adhered Matters)

After polishing, the clear coating film was wet wiped and dry wiped using a cloth (product name: 3M Finishing wipe 5351, size 36 cm×36 cm) to remove a remnant on the coating film, and then the presence or absence of adhered matters on the coating film was visually confirmed, and the evaluation was made based on the following criteria.

[Evaluation Criteria]

A . . . With no adhered matters; pass, with excellency
B . . . Partially with adhered matters; pass
C . . . Throughout with adhered matters; poor finish, fail.

(Evaluation Result)

Table 3 shows the evaluation results on the polishing with the sponge buff using the polishing compositions of Examples 1 to 7, 9 to 11 and Comparative Examples 1 to 3. "–" shown in Table 3 means no evaluation was carried out.

TABLE 1

Constituent features of polishing compositions

| | Abrasive grains (Aluminum oxide) | | Hydrophobic dispersing medium | | | | | | |
|---|---|---|---|---|---|---|---|---|---|
| | | | | Constituent of hydrophobic dispersing medium (organic solvent) [mass %] | | | | | |
| | Content {mass %} | Average particle size [μm] | Content [mass %] | 1 Flash point 30° C. Vapor pressure 1.4 kPa | 2 Flash point 63° C. Vapor pressure 0.05 kPa | 3 Flash point 75° C. Vapor pressure 0.023 kPa | 4 Flash point 86° C. Vapor pressure 0.006 kPa | 5 Flash point 139° C. Vapor pressure 0.001 kPa or less | 6 Flash point 168° C. Vapor pressure 0.001 kPa or less |
| Example 1 | 12 | 0.6 | 17.5 | 17.5 | — | — | — | — | — |
| Example 2 | 12 | 0.6 | 18.4 | 16 | — | — | — | — | 2.4 |
| Example 3 | 12 | 0.6 | 18 | 5.6 | — | 12.4 | — | — | — |
| Example 4 | 12 | 0.6 | 17.5 | — | 17.5 | — | — | — | — |
| Example 5 | 12 | 0.6 | 18 | 1.7 | — | — | 16.3 | — | — |
| Example 6 | 12 | 0.6 | 14.4 | — | 12 | — | — | — | 2.4 |
| Example 7 | 11 | 0.6 | 23 | — | 17.5 | — | — | — | 5.5 |
| Example 8 | 11 | 2.6 | 23 | — | 17.5 | — | — | — | 5.5 |
| Example 9 | 12 | 0.6 | 18.4 | — | — | 16 | — | — | 2.4 |
| Example 10 | 12 | 1.4 | 18.4 | — | — | — | 16 | — | 2.4 |
| Example 11 | 12 | 0.6 | 18 | — | — | — | 10 | — | 8 |
| Comparative Example 1 | 12 | 0.6 | 18 | — | — | — | 7.5 | — | 10.5 |
| Comparative Example 2 | 12 | 0.6 | 18.4 | — | — | — | — | 16 | 2.4 |
| Comparative Example 3 | 12 | 0.6 | 17.5 | — | — | — | — | — | 17.5 |

| | Hydrophobic dispersing medium | | | Other components | | | |
|---|---|---|---|---|---|---|---|
| | FPI converted Flash point [° C.] | Mixed vapor pressure [kPa] | Benzene• halogenated organic solvent content [mass %] | Surfactant [mass %] | Emulsion stabilizer [mass %] | Thickener [mass %] | Antiseptic agent [mass %] |
| Example 1 | 30 | 1.4000 | 1.5 or more | 1.6 | 2 | 0.95 | 0.1 |
| Example 2 | 32 | 1.3065 | 1.5 or more | 1.6 | 2 | 0.95 | 0.1 |
| Example 3 | 49 | 0.5393 | more than 0.5 | 1.6 | 2 | 0.95 | 0.1 |
| Example 4 | 63 | 0.0500 | 0.5 or less | 1.6 | 2 | 0.95 | 0.1 |
| Example 5 | 66 | 0.1877 | 0.5 or less | 1.6 | 2 | 0.95 | 0.1 |
| Example 6 | 66 | 0.0445 | 0.5 or less | 1.2 | 2 | 0.95 | 0.1 |
| Example 7 | 67 | 0.0419 | 0.5 or less | 2 | 2 | 0.95 | 0.1 |
| Example 8 | 67 | 0.0419 | 0.5 or less | 2 | 2 | 0.95 | 0.1 |
| Example 9 | 77 | 0.0211 | 0.5 or less | 1.6 | 2 | 0.95 | 0.1 |
| Example 10 | 88 | 0.0055 | 0.5 or less | 1.6 | 2 | 0.95 | 0.1 |
| Example 11 | 96 | 0.0042 | 0.5 or less | 1.6 | 2 | 0.95 | 0.1 |
| Comparative Example 1 | 104 | 0.0035 | 0.5 or less | 1.6 | 2 | 0.95 | 0.1 |
| Comparative Example 2 | 142 | 0.0010 | 0.5 or less | 1.6 | 2 | 0.95 | 0.1 |
| Comparative Example 3 | 168 | 0.0010 | 0.5 or less | 1.6 | 2 | 0.95 | 0.1 |

TABLE 2

| Evaluation results on polishing using a wool buff | | | | |
|---|---|---|---|---|
| | FPI converted flash point [° C.] | Mixed vapor pressure [kPa] | Evaluation results on polishing using wool buff Object to be polished: pencil hardness H Machining capacity | Cleaning property |
| Example 1 | 30 | 1.4000 | A(75) | B(17) Force needed |
| Example 2 | 32 | 1.3065 | B(150) | B(13) Force needed |
| Example 3 | 49 | 0.5393 | A(105) | B(19) Force needed |
| Example 4 | 63 | 0.0500 | A(120) | A(16) |
| Example 5 | 66 | 0.1877 | A(105) | A(19) |
| Example 6 | 66 | 0.0445 | B(180) | A(19) |
| Example 7 | 67 | 0.0419 | A(105) | A(19) |
| Example 8 | 67 | 0.0419 | A(90) | A(17) |
| Example 9 | 77 | 0.0211 | A(135) | A(16) |
| Example 10 | 88 | 0.0055 | B(150) | A(17) |
| Example 11 | 96 | 0.0042 | B(150) | A(18) |
| Comparative Example 1 | 104 | 0.0035 | C(195) | B(21) |
| Comparative Example 2 | 142 | 0.0010 | C(210) | B(21) |
| Comparative Example 3 | 168 | 0.0010 | C(210) | B(25) |

TABLE 3

| Evaluation results on polishing using a sponge buff | | | | | | | |
|---|---|---|---|---|---|---|---|
| | | | Evaluation results on polishing using sponge buff | | | | |
| | FPI | Mixed | Object to be polished: pencil hardness H | | | Object to be polished: pencil hardness F | |
| | converted flash point [° C.] | vapor pressure [kPa] | Machining capacity Polishing speed [μm/min] | Cleaning property | Presence/absence of adhered matter | Cleaning property | Presence/absence of adhered matter |
| Example 1 | 30 | 1.4000 | 0.9 | A(16) | A (Absent) | B(28) | A (Absent) |
| Example 2 | 32 | 1.3065 | 0.7 | A(19) | A (Absent) | B(27) | A (Absent) |
| Example 3 | 49 | 0.5393 | 1.4 | B(24) | A (Absent) | B(33) | A (Absent) |
| Example 4 | 63 | 0.0500 | 0.9 | B(27) | A (Absent) | B(24) | A (Absent) |
| Example 5 | 66 | 0.1877 | 1.4 | B(20) | A (Absent) | B(29) | A (Absent) |
| Example 6 | 66 | 0.0445 | 0.7 | A(15) | A (Absent) | B(23) | A (Absent) |
| Example 7 | 67 | 0.0419 | 0.8 | A(18) | A (Absent) | B(26) | A (Absent) |
| Example 8 | 67 | 0.0419 | — | — | — | — | — |
| Example 9 | 77 | 0.0211 | 0.9 | A(15) | A (Absent) | B(35) | B (Partially present) |
| Example 10 | 88 | 0.0055 | 1.3 | A(15) | A (Absent) | B(25) | B (Partially present) |
| Example 11 | 96 | 0.0042 | 1.1 | A(19) | A (Absent) | B(39) | B (Partially present) |
| Comparative Example 1 | 104 | 0.0035 | 1.3 | B(24) | A (Absent) | B(30) | C (Present throughout) |
| Comparative Example 2 | 142 | 0.0010 | 0.7 | B(26) | A (Absent) | C(46) | C (Present throughout) |
| Comparative Example 3 | 168 | 0.0010 | 1.1 | B(22) | A (Absent) | C(41) | C (Present throughout) |

As shown in Table 2 and Table 3, it was revealed that when the polishing compositions of Examples 1 to 11 were used, the machining capacity in the rough polishing and finish polishing was excellent, and the cleaning property after polishing was also good.

These findings show the polishing composition containing the hydrophobic dispersing medium having a flash point in the specific range can provide the effects of excellent machining capacity and good cleaning property.

The present application is based on the Japanese Patent Application No. 2021-059448 filed on Mar. 31, 2021, and the contents disclosed herein are deemed to be incorporated in its entirety by reference into the present description.

The invention claimed is:

1. A polishing composition comprising abrasive grains, water, and a hydrophobic dispersing medium, wherein the hydrophobic dispersing medium comprises at least two organic solvents selected from the group consisting of normal paraffin hydrocarbons, isoparaffin hydrocarbons, naphthenic hydrocarbons, and terpene hydrocarbons, and has a FPI flash point of 30° C. or more and 100° C. or less, wherein the hydrophobic dispersing medium comprises:

an organic solvent having a flash point of more than 45° C. and 65° C. or less, or an organic solvent having a flash point of more than 65° C. and less than 100° C.; and an organic solvent having a flash point of 100° C. or more and 180° C. or less.

2. The polishing composition according to claim 1, wherein the hydrophobic dispersing medium has a mixed vapor pressure at 20° C. of 0.004 kPa or more and 2 kPa or less.

3. The polishing composition according to claim 1, wherein the hydrophobic dispersing medium has a FPI flash point of 50° C. or more and 80° C. or less.

4. The polishing composition according to claim 1, wherein the hydrophobic dispersing medium has a FPI flash point of 64° C. or more and 74° C. or less.

5. The polishing composition according to claim 1, wherein the hydrophobic dispersing medium is contained at 15 mass % or more and 40 mass % or less relative to the total mass of the polishing composition.

6. The polishing composition according to claim 1, further comprising a surfactant.

7. The polishing composition according to claim 1, wherein the abrasive grain is aluminum oxide.

8. The polishing composition according to claim 7, wherein the aluminum oxide has an α-conversion rate of 50% or more.

9. The polishing composition according to claim 1, wherein a volume average particle size of the abrasive grains is 0.05 μm or more and 10 μm or less.

10. The polishing composition according to claim 1, wherein the abrasive grains are contained at 5 mass % or more and 30 mass % or less relative to the total mass of the polishing composition.

11. The polishing composition according to claim 1, wherein the polishing composition is used for finish polishing of a resin material having a pencil hardness of F or lower.

12. A polishing method, comprising polishing an object to be polished using the polishing composition according to claim 1.

13. The polishing method according to claim 12, wherein the object to be polished comprises at least one selected from the group consisting of resin materials, alloy materials, and glass materials.

14. A polishing method, comprising polishing a coated surface with a wool buff and/or a sponge buff, using the polishing composition according to claim 1.

15. A polishing composition comprising abrasive grains, water, and a hydrophobic dispersing medium, wherein the hydrophobic dispersing medium comprises at least two organic solvents selected from the group consisting of normal paraffin hydrocarbons, isoparaffin hydrocarbons, naphthenic hydrocarbons, and terpene hydrocarbons, and has a mixed vapor pressure at 20° C. of 0.004 kPa or more and 2 kPa or less, wherein the hydrophobic dispersing medium comprises:

an organic solvent having a vapor pressure at 20° C. of 0.01 kPa or more and 0.1 kPa or less; and an organic solvent having a vapor pressure at 20° C. of 0.001 kPa or less.

16. A method for producing a polishing composition, comprising:

a step of providing a hydrophobic dispersing medium comprising at least two organic solvents selected from the group consisting of normal paraffin hydrocarbons, isoparaffin hydrocarbons, naphthenic hydrocarbons, and terpene hydrocarbons, and wherein the hydrophobic dispersing medium has a mixed vapor pressure at 20° C. of 0.004 kPa or more and 2 kPa or less, and comprises:

an organic solvent having an organic solvent having a vapor pressure at 20° C. of 0.01 kPa or more and 0.1 kPa or less; and an organic solvent having a vapor pressure at 20° C. of 0.001 kPa or less; and/or wherein the hydrophobic dispersing medium has a FPI flash point of 30° C. or more and 100° C. or less, and comprises:

an organic solvent having a flash point of more than 45° C. and 65° C. or less, or an organic solvent having a flash point of more than 65° C. and less than 100° C.; and an organic solvent having a flash point of 100° C. or more and 180° C. or less; and a step of mixing the hydrophobic dispersing medium, water, and abrasive grains.

17. A polishing method, comprising polishing an object to be polished using the polishing composition obtained by the production method of claim 16.

18. A polishing method, comprising polishing a coated surface with a wool buff and/or a sponge buff, using the polishing composition obtained by production method of claim 16.

* * * * *